US010501116B2

(12) United States Patent
Mizoguchi (10) Patent No.: US 10,501,116 B2
(45) Date of Patent: Dec. 10, 2019

(54) AUTOMATIC STEERING CONTROL DEVICE

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 128 days.

(21) Appl. No.: 15/889,601

(22) Filed: Feb. 6, 2018

(65) Prior Publication Data

US 2018/0281850 A1 Oct. 4, 2018

(30) Foreign Application Priority Data

Mar. 31, 2017 (JP) .................. 2017-070768

(51) Int. Cl.
*B62D 6/04* (2006.01)
*B62D 1/28* (2006.01)
*B62D 5/04* (2006.01)
*B62D 15/02* (2006.01)

(52) U.S. Cl.
CPC ............ *B62D 6/04* (2013.01); *B62D 1/286* (2013.01); *B62D 5/0481* (2013.01); *B62D 15/025* (2013.01)

(58) Field of Classification Search
None
See application file for complete search history.

(56) References Cited

U.S. PATENT DOCUMENTS

2019/0193776 A1* 6/2019 Tsubaki ............... B62D 5/0484

FOREIGN PATENT DOCUMENTS

| JP | 10-076964 A | | 3/1998 |
|----|-------------|---|--------|
| JP | 10076964 A | * | 3/1998 |
| JP | 2002-175597 A | | 6/2002 |
| JP | 2013-147194 A | | 8/2013 |

(Continued)

OTHER PUBLICATIONS

Japanese Office Action Decision to Grant a Patent issued in corresponding Japanese Patent Application No. 2017-070768, dated Feb. 5, 2019, with English Translation.

(Continued)

*Primary Examiner* — Christian Chace
*Assistant Examiner* — Katherine Marie Fitzharris
(74) *Attorney, Agent, or Firm* — McDermott Will & Emery LLP (57) ABSTRACT

An automatic steering control device includes: a steering assist device; and a steering control unit. The steering control unit includes an input-output unit, a memory unit, a first abnormality detection unit, a second abnormality detection unit, an instruction value computation unit, and a switching unit. The steering assist device calculates a first instruction value to be output to a steering device included in a vehicle to make the vehicle travel along a target travel road shape calculated based on at least one of external environment information or map information of the vehicle based on the target travel road shape and a state quantity output from a state quantity detection device that detects behavior of the vehicle. The steering control unit controls the steering device based on the first instruction value during automatic driving of the vehicle.

3 Claims, 4 Drawing Sheets

(56) References Cited

FOREIGN PATENT DOCUMENTS

| JP | 2013147194 A | * | 8/2013 |
| JP | 2016-016735 A | | 2/2016 |
| JP | 2016016735 A | * | 2/2016 |
| JP | 2016-084093 A | | 5/2016 |

OTHER PUBLICATIONS

Japanese Office Action issued in corresponding Japanese Patent Application No. 2017-070768, dated Sep. 11, 2018, with English Translation.

* cited by examiner

AUTOMATIC STEERING CONTROL DEVICE

CROSS-REFERENCE TO RELATED APPLICATIONS

The present application claims priority from Japanese Patent Application No. 2017-070768 filed on Mar. 31, 2017, the entire contents of which are hereby incorporated by reference.

BACKGROUND

1. Technical Field

The present invention relates to an automatic steering control device for vehicles.

2. Related Art

As disclosed in, for instance, Japanese Unexamined Patent Application Publication No. 2002-175597, there is a known automatic steering control device having an external environment recognition device that recognizes the peripheral environment of a vehicle, such as the shape of a road ahead of the vehicle, and performing the automatic driving of the vehicle based on the recognition results by the external environment recognition device.

When automatic driving is disabled because, for instance, the communication function of CAN fails due to, for instance, a cable being broken in the automatic steering control device, the control of automatic driving abnormally ends immediately. Accordingly, since the steering of the vehicle is not performed until the driver of the vehicle starts manual driving after recognizing an abnormal end of automatic driving due to beep tones or the like, the behavior of the vehicle may become turbulent.

SUMMARY OF THE INVENTION

It is desirable to provide an automatic steering control device capable of shifting to manual driving without making the behavior of the vehicle turbulent when automatic driving abnormally ends.

An aspect of the present invention provides an automatic steering control device including a steering assist device and a steering control unit. The steering assist device is configured to calculate, on a basis of a target travel road shape and a state quantity, a first instruction value to be output to a steering device mounted on a vehicle to cause the vehicle to travel along the target travel road shape. The target travel road shape is calculated based on one or both of external environment information of the vehicle or map information. The state quantity is output from a state quantity detection device configured to detect behavior of the vehicle. The steering control unit is configured to controls the steering device based on the first instruction value during automatic driving of the vehicle. The steering control unit includes an input-output unit, a memory unit, a first abnormality detection unit, a second abnormality detection unit, an instruction value computation unit, and a switching unit. The input-output unit is configured to communicate with the steering assist device and the state quantity detection device. The memory unit is configured to store a future travel road shape that is the target travel road shape for a predetermined time period from the present time and the state quantity at the present time. The first abnormality detection unit is configured to detect occurrence of a failure in one or both of operation of the steering assist device or communication between the steering assist device and the input-output unit. The second abnormality detection unit is configured to detect occurrence of a failure in one or both of the operation of the state quantity detection device or the communication between the steering assist device and the input-output unit. The instruction value computation unit is configured to calculate, based on the state quantity input from the state quantity detection device and the future travel road shape stored in the memory unit, a second instruction value to be output to the steering device to cause the vehicle to travel along the future travel road shape when a first failure state is entered in which the occurrence of the failure is detected by the first abnormality detection unit during automatic driving. The instruction value computation unit is configured to calculate, based on the latest state quantity and the future travel road shape stored in the memory unit, a third instruction value to be output to the steering device to cause the vehicle to travel along the future travel road shape when a second failure state is entered in which the occurrence of the failure is detected by the first abnormality detection unit and the second abnormality detection unit during automatic driving. The switching unit is configured to control the steering device based on the first instruction value output from the steering assist device in a normal state in which no failure is detected by the first abnormality detection unit and the second abnormality detection unit during automatic driving, control the steering device based on the second instruction value output from the instruction value computation unit in the first failure state, and control the steering device based on the third instruction value output from the instruction value computation unit in the second failure state.

DETAILED DESCRIPTION

A preferred example of the present invention will be described below with reference to the drawings. In the drawings used in the following description, although the scales of individual components are different so that individual components can be recognized on the drawings, the present invention is not limited to the number of the components, the shapes of the components, and ratios of the sizes of the components, and the relative positions of the components illustrated in the drawings.

Figure 1:
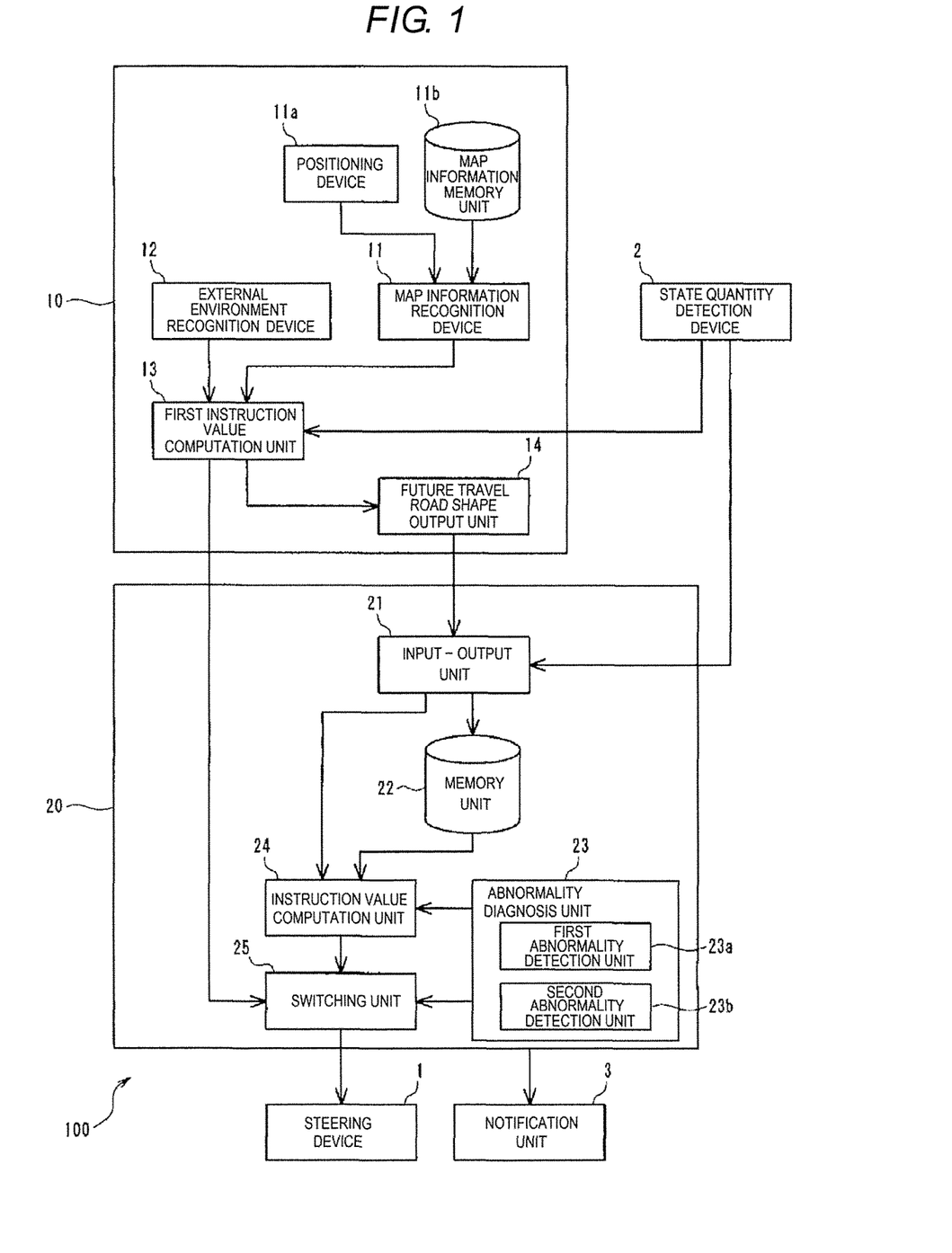
FIG. 1 is a block diagram illustrating the structure of an automatic steering control device.

An automatic steering control device 100 according to the example illustrated in FIG. 1 is installed in a vehicle and controls the operation of a steering device 1 included in the vehicle. The steering device 1 is an electric power steering device that has, for instance, an electric actuator and changes the steering angle of the vehicle based on an output from the electric actuator. The automatic steering control device 100 achieves an automatic driving function and a driving assist function of the vehicle by controlling the steering device 1.

The automatic steering control device 100 includes a steering assist device 10 and a steering control unit 20. In addition, the vehicle includes the steering device 1, a state quantity detection device 2, and a notification unit 3.

The state quantity detection device 2 detects a state quantity of the vehicle. The state quantity of the vehicle includes at least a vehicle speed V, which is the speed of the vehicle, an acceleration α in the vehicle front-rear direction, a yaw rate Yawr, which is an angular velocity in the vehicle yaw direction, and the steering angle of the steering device 1. That is, the state quantity detection device 2 includes at least a vehicle speed sensor, a yaw rate sensor, and a steering angle sensor. Since these sensors are known techniques, they are not described in detail. Although the acceleration α in the vehicle front-rear direction can be calculated based on the vehicle speed V, the state quantity detection device 2 may further include an acceleration sensor that detects the acceleration α in the vehicle front-rear direction.

The information of the state quantity output from the state quantity detection device 2 is input to the steering assist device 10 and the steering control unit 20, which will be described later. Communication between the state quantity detection device 2 and the steering assist device 10 and communication between the state quantity detection device 2 and the steering control unit 20 are performed via a known wired communication section or a known wireless communication section.

A notification unit 5 includes, for instance, a display device that displays images and characters, a light emitting device that emits light, a speaker that generates sound, a vibrator that generates vibrations, and a combination of these devices and outputs information from the automatic steering control device 100 to the driver.

The steering assist device 10 includes a map information recognition device 11, an external environment recognition device 12, a first instruction value computation unit 13, and a future travel road shape output unit 14.

The map information recognition device 11 includes a positioning device 11a that detects the current position (latitude, longitude) of the vehicle using at least one of a satellite positioning system (GNSS), an inertial navigation device, or road-to-vehicle communication and a map information memory unit 11b that stores map information. The map information includes information indicating the shapes of a road, such as the curvature of the road, the vertical section inclination of the road, intersections with other roads.

The map information recognition device 11 recognizes the shape of the travel road ahead of the vehicle based on the current position of the vehicle detected by the positioning device 11a and the map information stored by the map information memory unit 11b.

The external environment recognition device 12 recognizes the shape of the travel road ahead of the vehicle, the positions of objects present on the travel road and near the travel road based on information from sensors for recognizing the external environment of the vehicle and outputs the information as external environment information.

The external environment recognition device 12 has, for instance, a stereo camera having the viewing field ahead of the vehicle and recognizes the environment ahead of the vehicle by applying known image processing or the like to images taken by the stereo camera. Specifically, the external environment recognition device 12 recognizes linear indications provided on the road surface along the travel road of the vehicle and obstacles on the road surface. Linear indications represent linear or dashed road indications formed on the road surface along the left and right boundaries of a vehicle traffic zone to indicate the vehicle traffic zone. Since a device for recognizing the environment ahead of the vehicle using a stereo camera is known, the device will not be described in detail. It should be noted that the external environment recognition device 12 may include a radar or laser radar.

The first instruction value computation unit 13 is configured by a computer including a CPU, a ROM, a RAM, an input-output device, and the like coupled via a bus. The first instruction value computation unit 13 calculates a target travel road shape, which is the shape of a travel road on which the vehicle travels, based on at least one of map information output from the map information recognition device 11 or external environment information recognized by the external environment recognition device 12.

In addition, the first instruction value computation unit 13 calculates the first instruction value to be output to the steering device 1 so as to make the vehicle travel along the target travel road shape based on the state quantity (such as a yaw angle deviation and a lateral position deviation) with respect to the target travel road shape recognized by the map information recognition device 11 or the external environment recognition device 12 and the state quantity detected by the state quantity detection device 2 during automatic driving of the vehicle. The first instruction value is the information of a target value of the steering to be performed by the steering device 1 so that the vehicle travels along the target travel road shape. The first instruction value is, for instance, the value of a target steering angle to which the target steering device 1 needs to make a change in the example. It should be noted that the first instruction value may be the value of the steering torque that needs to be generated by the electric actuator included in the steering device 1.

The first instruction value output from the first instruction value computation unit 13 is input to the steering control unit 20, which will be described later. Communication between the steering assist device 10 having the first instruction value computation unit 13 and the steering control unit 20 is performed via a known wired communication section or a known wireless communication section.

In addition, the first instruction value computation unit 13 calculates the information of the future travel road shape, which is the target travel road shape for making the vehicle travel for a predetermined time period (A seconds) from now, based on at least one of map information or external environment information. The predetermined time A is, for instance, five seconds or so. The future travel road shape output unit 14 outputs the information of the future travel road shape to the steering control unit 20, which will be described later.

It should be noted that the future travel road shape may be calculated by the steering control unit 20, which will be described later. In this case, the steering assist device 10 outputs the map information and the external environment information required to calculate the future travel road shape to the steering control unit 20.

The steering control unit 20 is configured by a computer including a CPU, a ROM, a RAM, an input-output device, and the like coupled via a bus. The steering control unit 20 includes an input-output unit 21, a memory unit 22, an abnormality diagnosis unit 23, an instruction value computation unit 24, and a switching unit 25.

These components included in the steering control unit 20 may be implemented as separate hardware units that achieve individual functions or may be implemented as software so as to achieve individual functions by executing predetermined programs via a CPU.

The input-output unit 21 inputs and outputs information between the steering assist device 10 and the steering control unit 20 and between the state quantity detection device 2 and the steering control unit 20.

The memory unit 22 stores the future travel road shape, which is the target travel road shape for making the vehicle travel for a predetermined time period (A seconds) from now and the current state quantity. The current state quantity represents the latest state quantity having been input to the input-output unit 21 from the state quantity detection device 2. The state quantity of the vehicle stored by the memory unit includes at least the vehicle speed, which is the speed of the vehicle, the acceleration in the vehicle front-rear direction, the yaw rate, which is the angular velocity in the vehicle yaw direction, and the steering angle of the steering device 1.

The future travel road shape and the state quantity stored in the memory unit 22 are always updated at predetermined intervals. It should be noted that the intervals at which the future travel road shape is updated may be identical to or different from the intervals at which the state quantity is updated.

The abnormality diagnosis unit 23 detects the presence or absence of occurrence of a failure in the operation of the steering assist device 10 and the state quantity detection device 2 and detects the presence or absence of occurrence of a failure in communication between the steering assist device 10 and the input-output unit 21 and communication between the state quantity detection device 2 and the input-output unit 21.

The state in which a failure occurs in at least one of the operation of the steering assist device 10 or communication between the steering assist device 10 and the input-output unit 21 is referred to below as the first failure state. In addition, the state in which a failure occurs in at least one of the operation of the state quantity detection device 2 or communication between the state quantity detection device 2 and the input-output unit 21 in addition to the first failure state is referred to below as the second failure state.

The abnormality diagnosis unit 23 according to the example includes a first abnormality detection unit 23a that detects whether the first failure state has been entered and a second abnormality detection unit 23b that detects whether the second failure state has been entered. The first abnormality detection unit 23a decides that the first failure state has been entered when the steering assist device 10 has output information indicating the occurrence of a failure in the operation of the steering assist device 10 or when communication between the steering assist device 10 and the input-output unit 21 has been interrupted. In addition, when the steering assist device 10 has output information indicating the occurrence of a failure in the operation of the steering assist device 10 or when communication between the steering assist device 10 and the input-output unit 21 has been interrupted, and when the state quantity detection device 2 has output information indicating the occurrence of a failure in the operation of the state quantity detection device 2 or when communication between the state quantity detection device 2 and the input-output unit 21 has been interrupted, the second abnormality detection unit 23b decides that the second failure state has been entered. The function of the first abnormality detection unit 23a and the function of the second abnormality detection unit 23b may be implemented as a single hardware unit.

When the abnormality diagnosis unit 23 detects that the first failure state or the second failure state has been entered during automatic driving of the vehicle, the instruction value computation unit 24 calculates an instruction value to be output to the steering device 1 so as to make the vehicle travel along the future travel road shape stored in the memory unit 22.

Specifically, when the first failure state has been entered during automatic driving, the instruction value computation unit 24 calculates the second instruction value to be output to the steering device 1 so as to make the vehicle travel along the future travel road shape based on the state quantity input from the state quantity detection device 2 and the future travel road shape stored in the memory unit 22.

In addition, when the second failure state has been entered during automatic driving, the instruction value computation unit 24 calculates the third instruction value to be output to the steering device 1 so as to make the vehicle travel along the future travel road shape based on the latest state quantity and the future travel road shape stored in the memory unit 22.

During automatic driving, the switching unit 25 controls the steering device 1 based on the first instruction value output from the steering assist device 10 in a normal state that is not the first failure state or the second failure state, controls the steering device 1 based on the second instruction value output from the instruction value computation unit 24 in the first failure state, or controls the steering device 1 based on the third instruction value output from the instruction value computation unit 24 in the second failure state.

That is, when the steering assist device 10 and the state quantity detection device 2 operate normally, the automatic steering control device 100 according to the example performs the automatic driving of the vehicle based on the first instruction value calculated by the operation of the steering assist device 10. In addition, when the first failure state has been entered in which the steering assist device 10 fails and the state quantity detection device 2 operates normally during automatic driving of the vehicle, the automatic steering control device 100 performs the automatic driving of the vehicle based on the second instruction value calculated by the instruction value computation unit 24 included in the steering control device 20.

Figure 2:
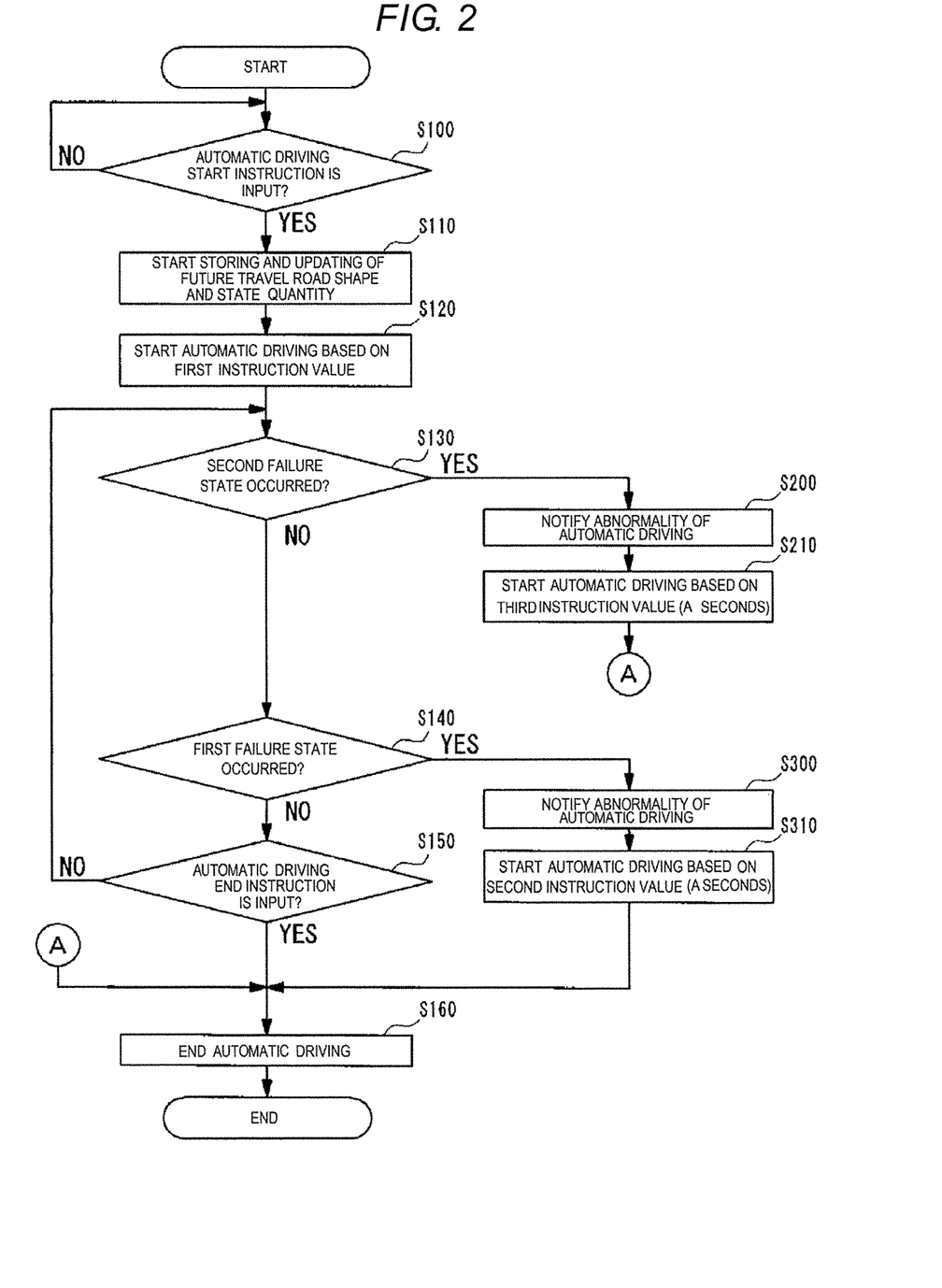
FIG. 2 is a flowchart illustrating the operation of the automatic steering control device.

Next, the operation of the automatic steering control device 100 having the structure described above will be described with reference to the flowchart illustrated in FIG. 2. The automatic steering control device 1 performs the processing illustrated in FIG. 2 during a travel of the vehicle.

First, in step S100, the automatic steering control device 1 waits for the driver of the vehicle to input an instruction operation for starting automatic driving. When deciding that the driver has input the instruction operation for starting automatic driving, the automatic steering control device 100 starts the processing in step S110 and the subsequent steps.

In the following description, time is represented as a variable t and the current time is represented as t=0. In addition, the vehicle speed, which is the speed of the vehicle, is represented as a variable $V(t)$ that changes over time, the acceleration in the vehicle front-rear direction is represented as a variable $\alpha(t)$ that changes over time, and the yaw rate, which is the angular velocity in the vehicle yaw direction, is represented as a variable $Yawr(t)$ that changes over time. In addition, the lateral position deviation, which is the amount of displacement in the vehicle width direction of the vehicle position from the target travel road shape, is represented as a variable $ErrX(t)$ that changes over time, and the yaw angle deviation, which is the amount of displacement in the yaw direction of the vehicle orientation from the target travel road shape, is represented as a variable ErrYaw(t) that changes over time.

In step S110, the automatic steering control device 100 causes the memory unit 22 included in the steering control unit 20 to start storing the future travel road shape and the current state quantity of the vehicle and updating the storage content. As described above, the future travel road shape is the target travel road shape for making the vehicle travel for a predetermined time period (A seconds) from now. In addition, the state quantity includes at least a vehicle speed V(0), which is the speed of the vehicle, an acceleration $\alpha(0)$ in the vehicle front-back direction, a yaw rate Yawr(0), which is the angular velocity in the vehicle yaw direction, and the steering angle of the steering device 1.

In the example, the memory unit 22 stores, for instance, the vehicle speed V(0), which is the speed of the vehicle, the acceleration $\alpha(0)$ in the vehicle front-rear direction, the yaw rate Yawr(0), which is the angular velocity in the vehicle yaw direction, the lateral position deviation ErrX(0), which is the current displacement of the vehicle position from the target travel road shape, and a yaw angle deviation ErrYaw (0). The lateral position deviation ErrX(0) and the yaw angle deviation ErrYaw(0) are calculated by the steering assist device 10 and input to the steering control unit 20 via the input-output unit 21. Since the information stored in the memory unit 22 is always changed when the vehicle is traveling, the information always continues to be updated in the normal state.

Next, in step S120, the automatic steering control device 100 starts the automatic driving that controls the steering device 1 based on the first instruction value calculated by the first instruction value computation unit 13 included in the steering assist device 10. Since the control of automatic driving by the steering assist device 10 is the same as a known technique, the control is not described in detail. Schematically, the first instruction value computation unit 13 of the steering assist device 10 determines the target travel road shape based on the latest recognition results from the map information recognition device 11 and the external recognition device 12 and calculates the first instruction value using feedforward control and feedback control that are based on information such as the yaw angle deviation and the lateral position deviation of the host vehicle from the target travel road shape recognized by the map information recognition device 11 and the external recognition device 12 and the state quantity of the vehicle.

After starting automatic driving based on the first instruction value, the automatic steering control device 100 continues the automatic driving until the driver inputs an instruction operation for ending the automatic driving as long as the normal state is kept (YES in step S150).

Then, the automatic steering control device 100 according to the example proceeds to step S200 when the second abnormality detection unit 23b detects the second failure state during automatic driving (YES in step S130).

In step S200, the automatic steering control device 100 informs the driver via the notification unit 3 that a failure has occurred and the automatic steering control device 100 ends automatic driving in A seconds. In step S210, the automatic steering control device 100 continues the automatic driving for controlling the steering device 1 in only A seconds after detecting the occurrence of the second failure state, based on the third instruction value calculated by the instruction value computation unit 24 included in the steering control unit 20.

Figure 3:
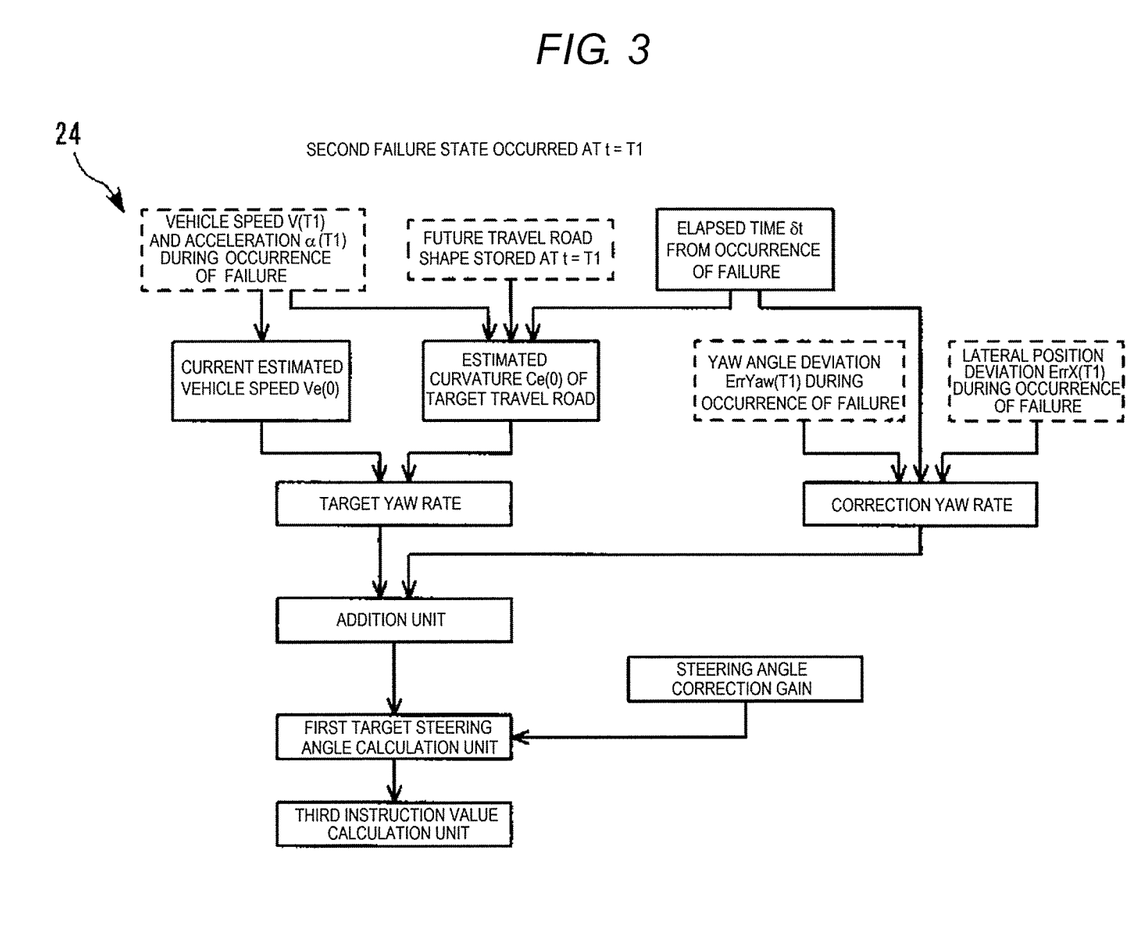
FIG. 3 schematically illustrates the method for calculating a third instruction value in an instruction value computation unit when a second failure state occurs.

FIG. 3 schematically illustrates the method for calculating the third instruction value by the instruction value computation unit 24. It is assumed below that the second failure state has occurred at time t=T1 and the elapsed time from time T1 is $\delta T$.

Since communication between the steering assist device 10 and the steering control unit 20 and communication between the state quantity detection device 2 and the steering control unit 20 are interrupted in the second failure state, the future travel road shape, the values of the lateral position deviation ErrX(t) and the yaw angle deviation ErrYaw(t), and the state quantity of the vehicle stored in the memory unit 22 are not updated after occurrence of the second failure state. Accordingly, after occurrence of the second failure state, the memory unit 22 stores the future travel road shape at time T1, the lateral position deviation ErrX(T1) and the yaw angle deviation ErrYaw(T1) at time T1, and the state quantity at time T1. The state quantity at time T1 includes the vehicle speed V(T1), the acceleration $\alpha(T1)$, and the yaw rate Yawr(0). The values enclosed in dashed rectangles in FIG. 3 are values stored in the memory unit 22.

When the second failure state occurs, the instruction value computation unit 24 estimates the curvature Ce(0) of the target travel road based on the future travel road shape and the state quantity of the vehicle stored in the memory unit 22 when the second failure state has occurred (t=T1) and the elapsed time $\delta t$ from the occurrence of the second failure state. Specifically, the instruction value computation unit 24 estimates the current vehicle speed Ve(0) of the vehicle based on the vehicle speed V(T1) and the acceleration $\alpha(T1)$ when the second failure state has occurred and the elapsed time $\delta t$. Then, the instruction value computation unit 24 calculates a travel distance based on the integral value of an estimated vehicle speed Ve(0) for the last $\delta t$ seconds from now, estimates the current position of the vehicle on the stored future travel road shape, and estimates the curvature Ce(0) of the target travel road based on the current position and the future travel road shape.

Then, the instruction value computation unit 24 causes a target yaw rate calculation unit to calculate the target yaw rate necessary to change the yaw angle of the vehicle to the yaw angle along the target travel road based on the current estimated vehicle speed Ve(0) and an estimated curvature Ce(0) of the target travel road via the target yaw rate calculation unit. The target yaw rate is calculated based on the current estimated vehicle speed Ve(0) and the estimated curvature Ce(0) of the target travel road.

In addition, when the lateral position deviation ErrX(T1), which is the current position displacement in the vehicle width direction from the target travel road, or the yaw angle deviation ErrYaw(T1), which is the current angle displacement in the vehicle yaw direction from the target travel road exceeds a predetermined value during occurrence of the second failure state (t=T1), the instruction value computation unit 24 causes a correction yaw rate calculation unit to calculate a correction yaw rate necessary for returning the vehicle to the future travel road using the lateral position deviation ErrX(T1) and the yaw angle deviation ErrYaw (T1). That is, the correction yaw rate corrects the displacement of the vehicle from the target travel road caused by a disturbance such as, for instance, the cant of a road surface or side wind.

Then, the instruction value computation unit 24 adds the correction yaw rate to the target yaw rate and, based on this result, calculates the first target steering angle in a first target steering angle calculation unit. It should be noted that, when the first target steering angle is calculated, a steering angle correction gain for correcting the displacement between the preset motion characteristics of the vehicle and the actual motion characteristic of the vehicle is taken into consideration.

Then, the instruction value computation unit 24 outputs the first target steering angle as the third instruction value. That is, the third instruction value used for automatic driving when the second failure state occurs includes only the component of the first target steering angle for making feedforward control of the steering device 1 based on the information of the future travel road shape and the state quantity of the vehicle stored in the memory unit 22. The third instruction value does not include the component used for feedback control of the steering device 1.

Since the information of the future travel road shape stored in the memory unit 22 when the second failure state occurs covers only the predetermined time period (A seconds), the instruction value computation unit 24 ends the automatic driving that is based on the third instruction value when the predetermined time period elapses after occurrence of the second failure state.

In addition, the automatic steering control device 100 according to the example proceeds to step S300 when the first abnormality detection unit 23a detects the first failure state during automatic driving (YES in step S140).

In step S300, the automatic steering control device 100 informs the driver via the notification unit 5 that a failure has occurred and the automatic driving ends in A seconds. In step S310, the automatic steering control device 100 continues, in A seconds from the occurrence of the second failure state, the automatic driving that controls the steering device 1 based on the second instruction value calculated by the instruction value computation unit 24 included in the steering control unit 20.

Figure 4:
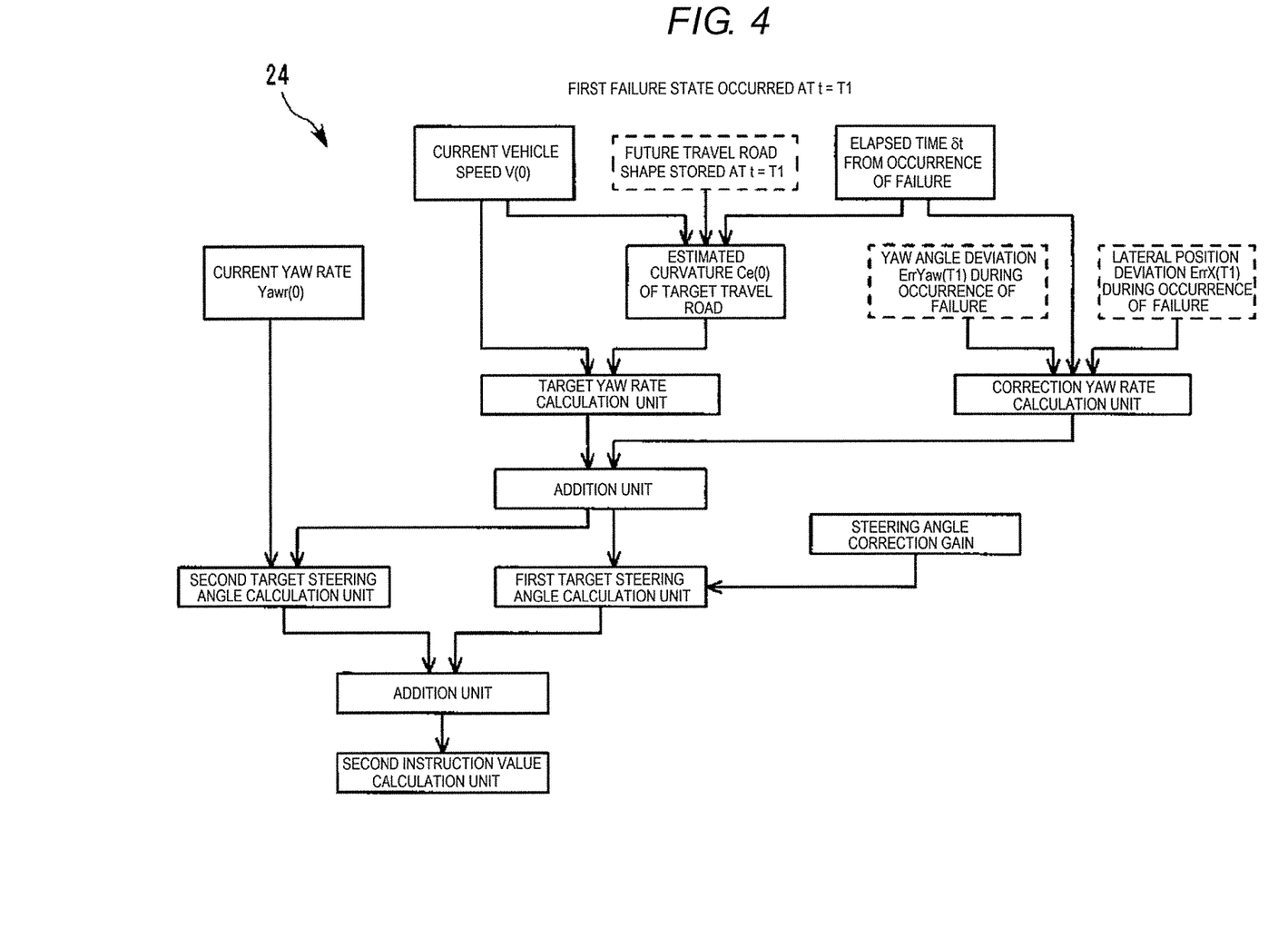
FIG. 4 schematically illustrates the method for calculating a second instruction value in the instruction value computation unit when a first failure state occurs.

FIG. 4 schematically illustrates the method for calculating the second instruction value by the instruction value computation unit 24. It is assumed below that the first failure state has occurred at time t=T1 and the elapsed time from time T1 is δT.

Since communication between the steering assist device 10 and the steering control unit 20 is interrupted in the first failure state, the future travel road shape and the values of the lateral position deviation ErrX(t) and the yaw angle deviation ErrYaw(t) stored in the memory unit 22 are not updated after occurrence of the first failure state. Accordingly, after occurrence of the first failure state, the memory unit 22 stores the future travel road shape at time T1 and the lateral position deviation ErrX(T1) and the yaw angle deviation ErrYaw(T1) at time T1. The values enclosed in dashed rectangles in FIG. 4 are values stored in the memory unit 22.

When the first failure state occurs, the instruction value computation unit 24 estimates the curvature Ce(0) of the target travel road based on the future travel road shape stored in the memory unit 22 when the first failure state has occurred (t=T1), the elapsed time St from the occurrence of the first failure state, and the current vehicle speed V(0). Specifically, the instruction value computation unit 24 calculates the travel distance based on the integral value of the vehicle speed of the last St seconds from now, estimates the current position of the vehicle on the stored future travel road shape, and estimates the curvature Ce(0) of the target travel road based on the current position and the future travel road shape.

Then, the instruction value computation unit 24 causes the target yaw rate calculation unit to calculate the target yaw rate necessary to change the yaw angle of the vehicle to the yaw angle along the target travel road based on the current vehicle speed V(0) and the estimated curvature Ce(0) of the target travel road. The target yaw rate is calculated based on the current vehicle speed V(0) and the estimated curvature Ce(0) of the target travel road.

In addition, when the lateral position deviation ErrX(T1), which is the current position displacement in the vehicle width direction from the target travel road, or the yaw angle deviation ErrYaw(T1), which is the current angle displacement in the vehicle yaw direction from the target travel road exceeds a predetermined value during occurrence of the first failure state (t=T1), the instruction value computation unit 24 causes a correction yaw rate calculation unit to calculate the correction yaw rate necessary for returning the vehicle to the future travel road using the lateral position deviation ErrX(T1) and the yaw angle deviation ErrYaw(T1). That is, the correction yaw rate corrects the displacement of the vehicle from the target travel road caused by a disturbance such as, for instance, the cant of a road surface or side wind.

Then, the instruction value computation unit 24 adds the correction yaw rate to the target yaw rate and, based on this result, calculates the first target steering angle in a first target steering angle calculation unit. It should be noted that, when the first target steering angle is calculated, a steering angle correction gain for correcting the displacement between the preset motion characteristics of the vehicle and the actual motion characteristic of the vehicle is taken into consideration.

In addition, the instruction value computation unit 24 calculates the second target steering angle for making feedback control so that the yaw angle of the vehicle becomes the yaw angle along the target travel road in the second target steering angle calculation unit based on the sum of the target yaw rate and the correction yaw rate and the yaw rate Yawr(0), which is the current state quantity of the vehicle.

The instruction value computation unit 24 outputs the sum of the first target steering angle and the second target steering angle as the second instruction value. That is, the second instruction value used for automatic driving when the first failure state occurs includes the component of the first target steering angle for making feedforward control of the steering device 1 based on the future travel road shape stored in the memory unit 22 and the current vehicle speed V(0) and the component of the second target steering angle for making feedback control of the steering device 1 based on the value of the current yaw rate Yawr(0) of the vehicle.

Since the information of the future travel road shape stored in the memory unit 22 when the first failure state occurs covers only the predetermined time period (A seconds), the instruction value computation unit 24 ends the automatic driving that is based on the second instruction value when the predetermined time period elapses after occurrence of the first failure state.

As described above, the automatic steering control device 100 according to the example stores, in the memory unit 22, the future travel road shape corresponding to the shape of the road on which the vehicle travels from now to the future that is a predetermined time period later and the state quantity such as the vehicle speed of the vehicle during automatic driving.

Then, when the first failure state occurs in which communication between the steering assist device 10 including the map information recognition device 11 and the external recognition device 12 and the steering control unit 20 for controlling the steering device 1 is interrupted, the automatic steering control device 100 continues automatic driving only for a predetermined time period by controlling the steering device 1 based on the stored future travel road shape and the information of the vehicle speed and the yaw rate detected in real time by the state quantity detection device 2. In this case, since the position of the vehicle can be estimated and the feedback control of a steering angle can be made according to changes in the state quantity of the vehicle, the automatic steering control device 100 can accurately make the vehicle travel along the stored future travel road shape only for a predetermined time.

In addition, when the second failure state occurs in which communication between the steering assist device 10 and the steering control unit 20 and communication between the state quantity detection device 2 and the steering control unit 20 are interrupted, the automatic steering control device 100 according to the example can also continue the automatic driving that makes the vehicle travel along the future travel road shape only for a predetermined time period by controlling the steering device 1 based on the latest future travel road shape and state quantity that have been stored.

Therefore, even after automatic driving is disabled because, for instance, the communication function of CAN fails due to a cable break or the like, the automatic steering control device 100 according to the example can continue automatic driving along the future travel road shape for the predetermined time period. In the automatic steering control device 100 according to the example, since a shift to manual driving by the driver can be made during the automatic driving along the future travel road shape after occurrence of a failure, it is possible to prevent the behavior of the vehicle from becoming turbulent if automatic driving abnormally ends.

The present invention is not limited to the above example and modifications may be made without departing from the spirit or the concept of the invention defined in the appended claim or the entire specification, and an automatic steering control device to which such modifications have been made also falls within the technical range of the present invention.

The invention claimed is:

1. An automatic steering control device comprising:
a steering assist device configured to calculate, on a basis of a target travel road shape and a state quantity, a first instruction value to be output to a steering device mounted on a vehicle to cause the vehicle to travel along the target travel road shape, the target travel road shape being calculated on a basis of one or both of external environment information of the vehicle and map information, the state quantity being output from a state quantity detection device configured to detect the state quantity including a vehicle speed and an acceleration of the vehicle; and
a steering control unit configured to control the steering device on the basis of the first instruction value during automatic driving of the vehicle,
wherein the steering control unit comprises
an input-output unit configured to communicate with the steering assist device and the state quantity detection device,
a memory unit configured to store a future travel road shape that is the target travel road shape for a predetermined time period from a present time and the state quantity at the present time,
a first abnormality detection unit configured to detect occurrence of a failure in one or both of operation of the steering assist device or communication between the steering assist device and the input-output unit,
a second abnormality detection unit configured to detect occurrence of a failure in one or both of the operation of the state quantity detection device or the communication between the steering assist device and the input-output unit,
an instruction value computation unit configured to
calculate, on the basis of the state quantity input from the state quantity detection device and the future travel road shape stored in the memory unit, a second instruction value to be output to the steering device to cause the vehicle to travel along the future travel road shape when a first failure state is entered in which the occurrence of the failure is detected by the first abnormality detection unit during the automatic driving, and
calculate, on a basis of the latest vehicle speed and acceleration and an elapsed time from the occurrence of a second failure state, a current estimated vehicle speed of the vehicle and a travel distance of the vehicle from a position of the occurrence of the second failure state and calculate, on a basis of a comparison of the current estimated vehicle speed and the travel distance with the future travel road shape stored in the memory unit, a third instruction value to be output to the steering device to cause the vehicle to travel along the future travel road shape when the second failure state is entered in which the occurrence of the failure is detected by the first abnormality detection unit and the second abnormality detection unit during the automatic driving, and
a switching unit configured to control the steering device on the basis of the first instruction value output from the steering assist device in a normal state in which no failure is detected by the first abnormality detection unit and the second abnormality detection unit during the automatic driving, control the steering device on the basis of the second instruction value output from the instruction value computation unit in the first failure state, and control the steering device on the basis of the third instruction value output from the instruction value computation unit in the second failure state.

2. The automatic steering control device according to claim 1, wherein
the steering assist device calculates a lateral position deviation and a yaw angle deviation that indicate a current displacement of a position of the vehicle from the target travel road shape;
the memory unit further stores, as the state quantity, the lateral position deviation and the yaw angle deviation, and upon the occurrence of the second failure state, the instruction value computation unit adds to the third instruction value a first correction yaw rate necessary for returning the vehicle to a position along the future travel road, when a latest value of the lateral position deviation and a latest value of the yaw angle deviation stored in the memory unit respectively exceed predetermined values.

3. The automatic steering control device according to claim 2, wherein
upon the occurrence of the first failure state, the instruction value computation unit adds to the second instruction value a second correction yaw rate necessary for returning the vehicle to a position along the future travel road, when the latest value of the lateral position deviation and the latest value of the yaw angle deviation stored in the memory unit respectively exceed predetermined values.

\* \* \* \* \*